United States Patent

Dolata et al.

[11] Patent Number: 5,899,114
[45] Date of Patent: May 4, 1999

[54] DIFFERENTIAL BALL SCREW AND NUT ASSEMBLY AND METHOD OF OBTAINING RELATIVE LINEAR MOTION DIFFERENTIALLY

[75] Inventors: Randy W. Dolata, Linden; David A. Sepesi, Midland; Greg F. Lange, Saginaw, all of Mich.

[73] Assignee: Thomson Saginaw Ball Screw Company, L.L.C., Saginaw, Mich.

[21] Appl. No.: 08/916,910

[22] Filed: Aug. 14, 1997

[51] Int. Cl.⁶ .................................................... F16H 25/22
[52] U.S. Cl. ........................................ 74/424.8 B; 74/459
[58] Field of Search ................................ 74/424.8 B, 459

[56] References Cited

U.S. PATENT DOCUMENTS

| | | | |
|---|---|---|---|
| 2,977,814 | 4/1961 | Brunson, Jr. | 74/424.8 B |
| 4,836,338 | 6/1989 | Taig | 74/424.8 B X |
| 5,313,852 | 5/1994 | Arena | 74/424.8 B X |
| 5,485,760 | 1/1996 | Lange . | |
| 5,722,304 | 3/1998 | Allen | 74/424.8 B X |

FOREIGN PATENT DOCUMENTS

| | | | |
|---|---|---|---|
| 3531640 | 5/1987 | Germany | 74/459 |
| 4413579A1 | 10/1995 | Germany . | |
| 4426682A1 | 2/1996 | Germany . | |
| 1465667 | 3/1989 | U.S.S.R. | 74/459 |

*Primary Examiner*—Allan D. Herrmann
*Attorney, Agent, or Firm*—Reising, Ethington, Barnes, Kisselle, Learman & McCulloch, P.C.

[57] ABSTRACT

A differential ball screw and nut assembly has an axially and rotatably fixed nut with an internal helical groove having a first lead to cooperate with a tubular ball screw having an external helical groove with a corresponding lead to provide a first raceway for a train of balls. The tubular ball screw also has an internal helical groove of the same hand with a second reduced lead relative to the first lead. A second rotatably fixed, radially inner screw having an external helical groove with a lead corresponding to the second lead cooperates with the internal groove of the tubular screw to provide a second raceway. A second train of load bearing balls transmits load between the tubular screw and second screw to move the screws differentially an axial distance corresponding to the number of rotations of the tubular screw times the lead differential.

18 Claims, 3 Drawing Sheets

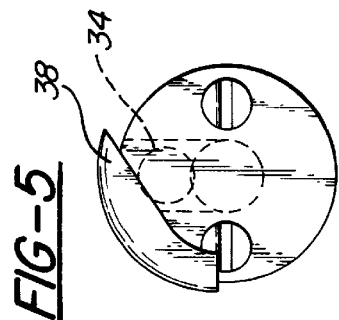
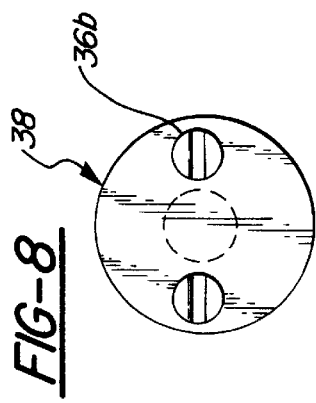
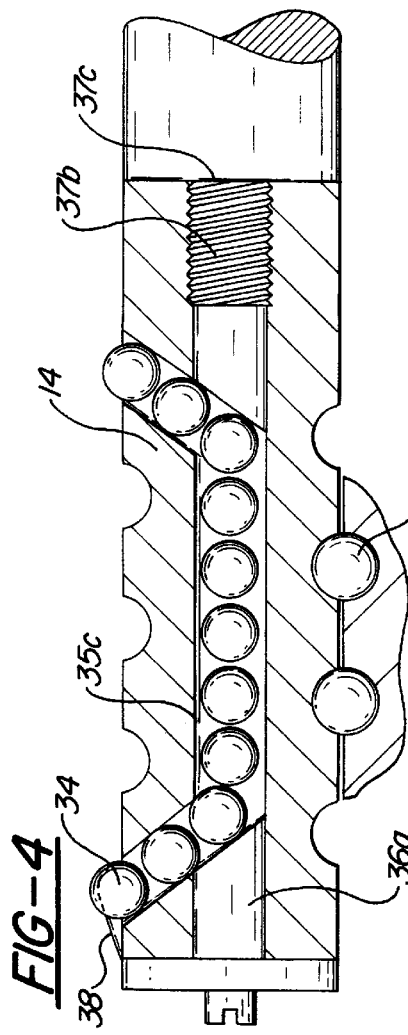
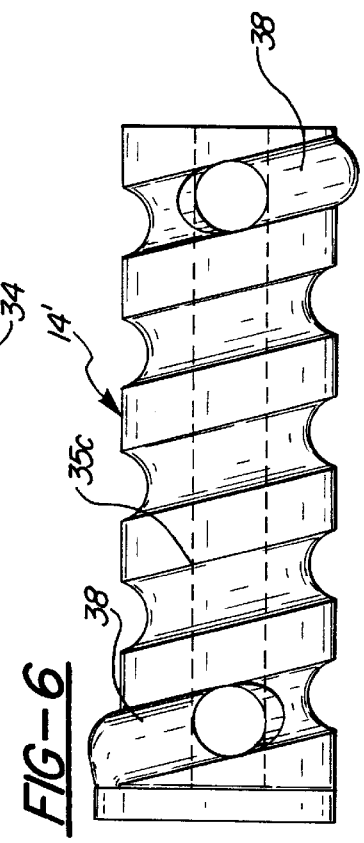
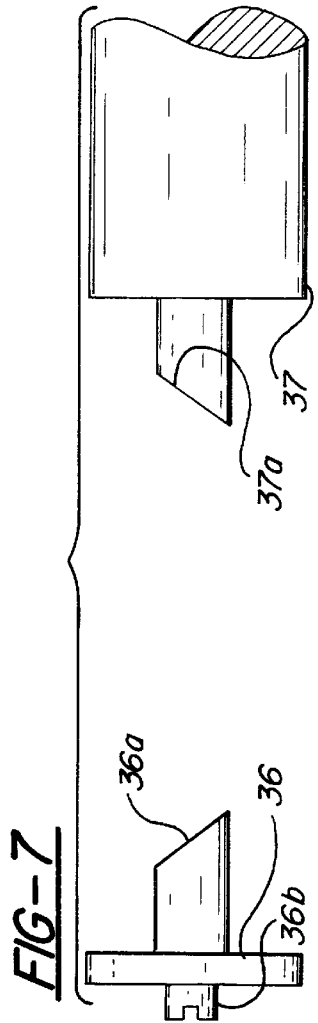

DIFFERENTIAL BALL SCREW AND NUT ASSEMBLY AND METHOD OF OBTAINING RELATIVE LINEAR MOTION DIFFERENTIALLY

This invention particularly relates to ball screw and nut devices for transmitting linear motion.

BACKGROUND OF THE INVENTION

Typical ball screw actuators employ a screw and nut of the general character disclosed in the present assignee's U.S. Pat. No. 5,485,760, for example, wherein the nut has an external ball return tube for a recirculating train of load bearing balls which is accommodated within a nut and screw groove helical raceway.

In this patent, the nut, which is fixed to a non-rotatable piston, is held against rotation. Reciprocating movement of the piston is caused by rotary movement of the screw in the usual manner via the train of load bearing balls. In another embodiment of the invention disclosed in the aforementioned patent, the screw may be revolved by a suitable motor or source of driving rotation while being fixed against axial movement and the nut, which is prevented from revolving, will be moved axially.

In the case of the configurations of the aforementioned patent, the ball screw lead may only be as small as the ball size permits. For example, if a 60 thousandths inch lead was specified, the ball diameter size could only be a fraction (for example 0.078215 inches) of this lead and a great many balls would be required for large loads. The present differential ball screw assembly permits the use of large load bearing balls (for example 0.3125 and 0.28215 inches), while providing a very fine resultant lead.

SUMMARY OF THE INVENTION AND ADVANTAGES

The present invention provides what may be termed a differential ball nut and screw assembly, utilizing a resultant lead for each drive revolution which is the difference between the leads of multiple ball screw helices. The design depicted advantageously utilizes an internal ball return passage in the interior screw to minimize the package diameter of the entire assembly and permit the elements of each assembly to be stacked one over the other diametrally in many applications in which the use of commercially available linear actuator assemblies would otherwise not be possible because of space limitations. The concept permits the use of ball screw actuators in those applications where a fine lead and high load capacity is required, such as in braking.

One of the prime objects of the inventions is to provide a ball and nut screw assembly wherein load capacity is maximized for a given package size.

Another object of the invention is to provide an actuator assembly wherein the assembly length is minimized because multiple ball nuts need not be axially offset to provide external ball return type circuitry.

Another object of the invention is to provide a simple, compact, practical and durable ball nut and screw linear actuator assembly and a method of achieving a resultant differential lead.

These and other objects, advantages and features of the present invention will become more readily apparent from the following detailed description when taken together with the accompanying drawings, wherein:

BRIEF DESCRIPTION OF THE DRAWINGS

In the drawings.

FIG. 4 is a fragmentary, partly sectional more detailed view of an inner screw member only, illustrating its internal ball return passage.

FIG. 5 is an end elevational view thereof.

FIG. 6 is a top plan view thereof.

FIG. 7 is a schematic exploded view similar to FIG. 4, showing only the end members for the inner screw which may be provided in one method of construction of the inner screw; and FIG. 8 is an end elevational view thereof.

MORE DETAILED DESCRIPTION

Figure 1:
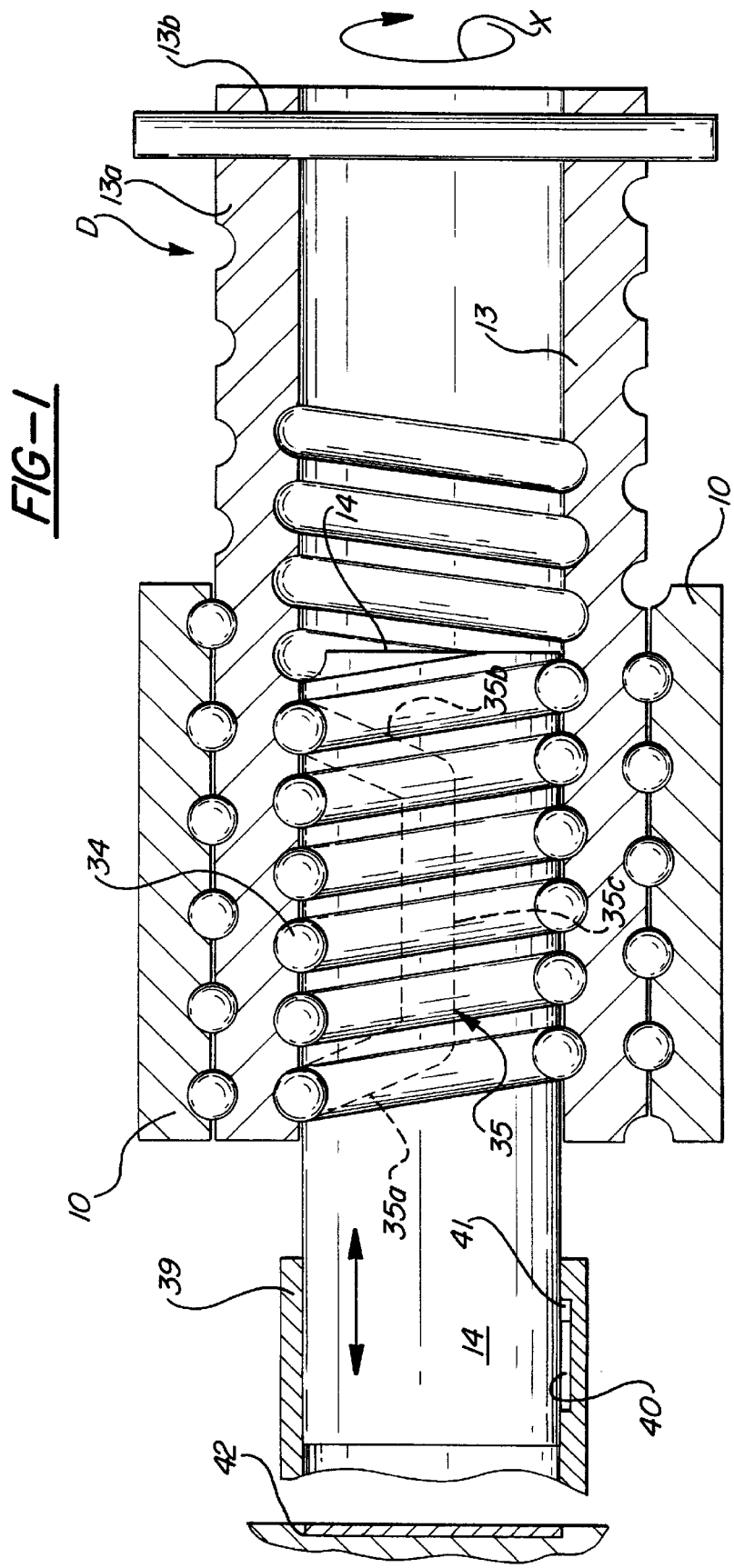
FIG. 1 is a schematic, fragmentary, side elevational view of a preferred embodiment of the invention, with the inner load carrying screw in a retracted position.
Figure 2:
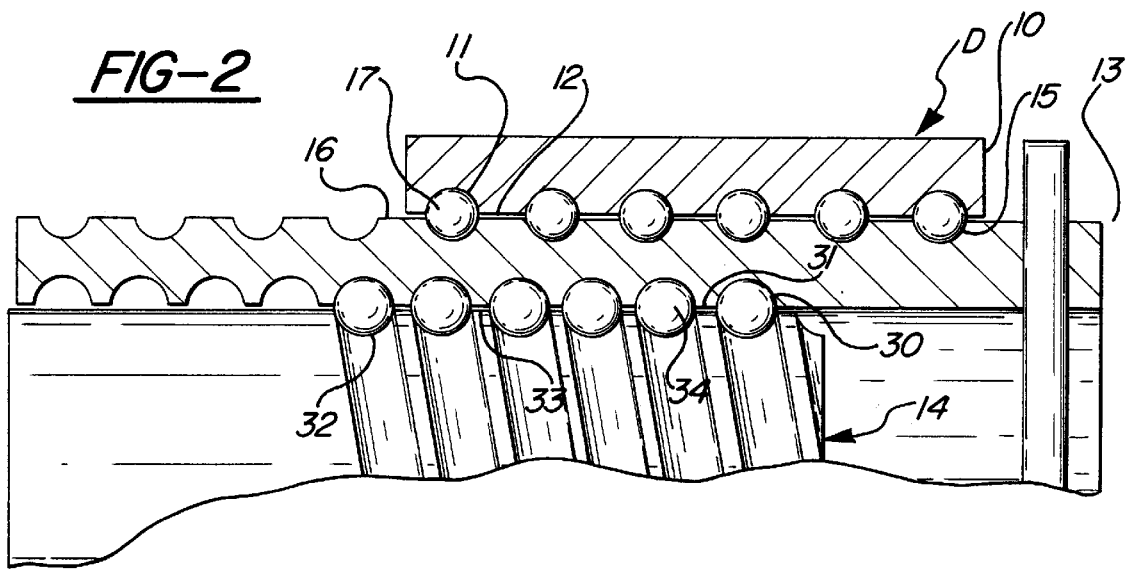
FIG. 2 is a similar schematic, fragmentary view, but with the load applying inner screw in an extend position.

With particular reference to FIGS. 1 and 2 in the first place, the differential ball nut and screw assembly, generally designated D, is disclosed in a presently preferred embodiment as incorporating an outer nut, generally designated 10, provided with an internal, helical ball-accommodating groove or groove portions 11 separated by a helical land or land portions 12.

Telescopically received within the nut 10 is a tubular outer screw, generally designated 13, which also functions as a nut for an inner screw or screw actuator member, generally designated 14 which can move only axially. Consequently, the member 13 may also be referenced as a nut or nut member. The nut member 13 has an exterior helical groove or groove portions 15 separated by a helical land or land portions 16 which match the nut 10 groove and land 11 and 12, respectively, and so have the same lead.

A train of abutting balls 17 is received in the raceway formed by the helical grooves 15 and 11 and, typically, cross-over ball return devices, such as shown in U.S. Pat. No. 4,905,534, for example, may be provided for the exterior nut 10. Alternatively, when space permits, external ball return tubes of the type disclosed in the aforementioned U.S. Pat. No. 5,485,760 may be provided. The ball nut 10 is prevented from rotating and is fixed against axial movement in any appropriate manner, for instance, by securing it to a fixed motor housing or suitable frame member F.

Figure 3:
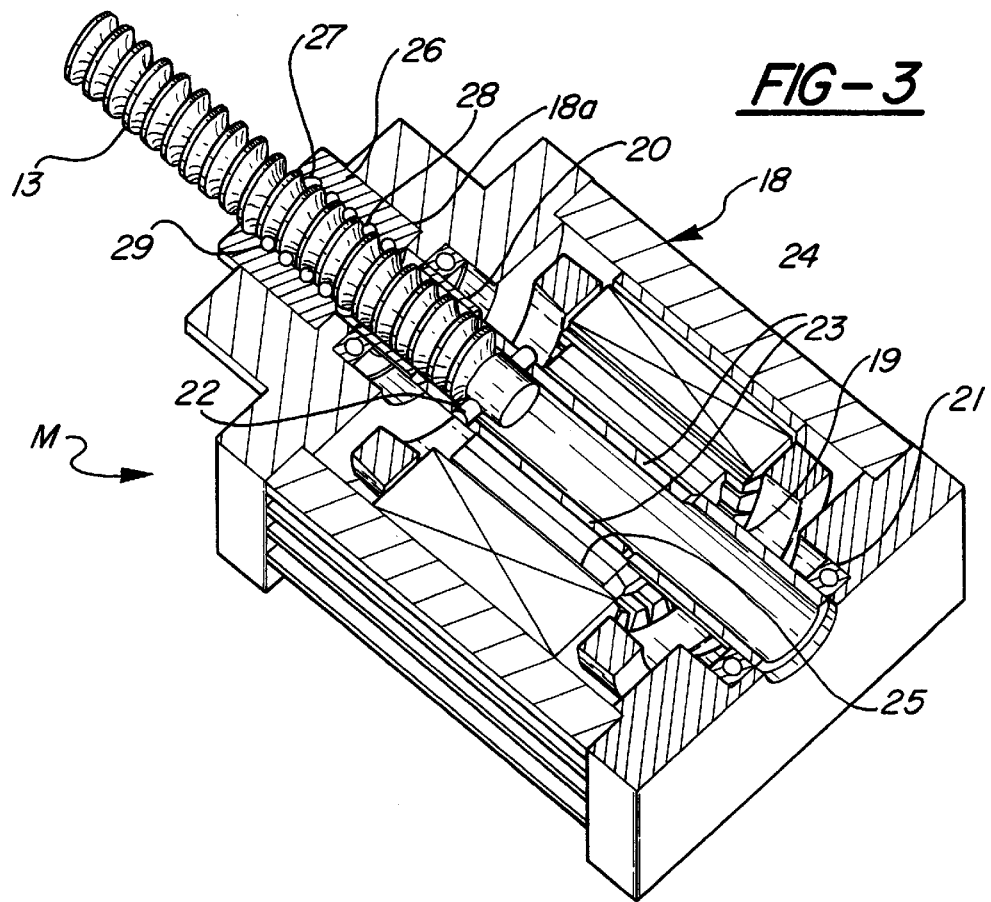
FIG. 3 is a schematic, perspective sectional view of a typical electric motor having a rotor shaft assembly which both rotates and translates the output screw shaft which is shown in an extended position.

The screw 13 may be driven in the manner disclosed in FIG. 3 by an electric motor, generally designated M. It is to be understood that the motor M is a prior art motor which is disclosed only illustratively as one way of powering the screw 13 and will, accordingly, not be described in detail. In FIG. 3, the view discloses an outer housing, generally designated 18, for a tubular armature drive shaft 19 which is rotated in the usual manner by the application of electrical current. Other drive shafts and motors or actuators may be used.

Bearings 20 and 21 are provided to journal the shaft 19 for rotation. At its one end, screw 13 has an integral, cylindrical end portion 13a, with aligned openings 13b for receiving a cross or drive pin 22. The ends of the drive pin 22 fit in diametrically aligned slots 23 provided in the sleeve shaft 19, so as to rotate with it but be capable of translatory longitudinal movement with respect to it.

The motor field coils are shown at 24 and the rotor coils at 25. Fixed by the motor housing 18 in a pocket 18a provided for it, is a ball nut 26 having a helical groove or groove portions 27 separated by a helical land 28. The groove portions 27 marry with the groove 15 in the screw 13 to provide a radially outer ball train raceway for the recirculating balls 29. While not shown, the nut 26 can have a ball return internal passage, such as disclosed in U.S. Pat. No. 5,193,409. With the nut 26 fixed and the screw 13, which has a lead identical to the lead of the groove 27, revolving, the screw 13 will be moved in translation axially as a result of its rotative movement.

The member 13 is a double screw in the sense that it is also internally helically configured to provide a helical groove 30 with groove portions separated by a helical land or land portions 31. The screw 14 is externally helically complementally configured with a helical groove or groove portions 32 separated by a helical land or land portions 33. The helical groove 32 and helical groove 30 have the same lead and match to provide a radially inner helical raceway for the abutting balls 34.

As FIG. 1 and FIGS. 4 through 6 particularly disclose, the interior screw 14 is provided with an internal return passage generally designated 35 which consists of a pair of inclined entrance and egress ends 35a and 35b connected by an in-line, axial or intermediate portion 35c. One method of constructing the passage 35 is shown in FIGS. 4–8, wherein the screw 14 previously schematically illustrated in FIGS. 1 and 2 is shown as flanked by the end cap members 36 and 37 shown in FIG. 7. Member 36 has an inclined projection surface 36a functioning to provide a deflecting portion of the internal raceway. The cylindrical end cap 36 has slotted screws 36b for securing the cap 36 to the screw 14. Conventional appropriately configured ball deflectors 38, fixed on the screw 14, extend into the nut screw 13 groove 30 to ease the travel of the balls into and out of the return passageway 35.

The extension member 37 mounts a projection with a similarly inclined surface 37a which has a threaded stem section 37b threaded into a threaded opening 37c provided in the member 37. The manner in which the balls 34 can be deflected to the passageway ends 35a and 35b by appropriate deflector members 38 which are secured to the screw 14 is illustrated in FIGS. 5 and 6 wherein the shaded areas depict the deflectors 38.

While inner screw 14 may be rotatably restrained in any appropriate manner, we have schematically illustrated one possible method of doing so in FIG. 1. Here a fixed sleeve 39 with a key slot 40 is shown as receiving a key 41 fixed to screw 14. Actuator screw 14 travels axially from right to left in FIG. 1 to engage the part 42 to be operated, such as a brake pad or actuator.

The train of abutting balls 34 shown may be, for example, considered to have a 0.3125 ball diameter and a raceway 30, 32 which has a 0.4375 inch right hand lead. The balls 17 may be considered, also by way of example, to have a diameter of 0.28125 inches with a raceway 11, 15 right hand lead of 0.5625 inches. The relative or resultant lead produced for screw 14 which is coupled to the load applying member (not shown) will be a 0.125 inch actual right hand lead per revolution of the outer screw 13.

The method of operation involves the following steps:

a. moving a tubular ball screw 13 having differential lead helical grooves externally at 15 and internally at 30 in one axial direction by revolving it relative to an axially and rotatably fixed ball nut 10, the internal groove 30 having a lead less than the external groove 15;

b. internally carrying the actuator screw 14, which has an external helical groove 32 with a lead corresponding to the internal groove lead of the tubular screw 13, along with the tubular screw 13;

c. utilizing a recirculating ball train comprised of balls 34 between the internal groove 30 of the tubular screw 13 and exterior groove 32 of the inner actuator screw 14 to differentially change axial movement of the inner actuator screw 14 relative to the axial movement of the tubular screw 13 and move the inner screw 14 an axial distance corresponding to the number of rotations of the tubular screw 13 times the lead differential.

The tubular screw 13 would normally carry the inner screw 14 with it the same axial distance, but the rotary fixing of the inner screw 14 causes the ball train to restrict movement of the inner screw 14 to correspond to the differential in leads.

With axial translation of the outer screw 13, imparted via stationary nut 10 by rotation of the screw 13 in the direction indicated by the arrow x in FIG. 1, a very fine resultant lead can be used with minimum axial package length because larger balls 34 are in use to provide the requisite load bearing capacity. The method of achieving the fine differential lead through use of fixing the outer nut 10 and preventing rotation of the inner screw 14, to provide an axial travel of the non-rotating inner screw 14, as shown in FIG. 1, is accomplished because the load bearing or load transfer balls 34 and the load bearing or load transfer balls 17 travel at differential speeds in their raceways due to differential diametrical arcs of travel and still provide a smooth non-binding operation. For example, four revolutions of screw 13 in FIG. 1 produce one-half inch of axial travel of screw 14.

The disclosed embodiments are representative of presently preferred forms of the invention, but are intended to be illustrative rather than definitive thereof. The invention is defined in the claims.

I claim:

1. A differential ball screw and nut assembly comprising:
   a. an axially and rotatably fixed nut having an internal helical groove with a first lead and a ball return;
   b. a first tubular ball screw with an external helical groove having a corresponding lead cooperating with said nut groove to provide a first raceway;
   c. a train of balls in said first raceway transmitting load to move said tubular ball screw rotatably and axially relative to said nut;
   d. said tubular ball screw having an internal helical groove of the same hand as said external helical groove and generally coextensive therewith, with a second different reduced lead relative to said first lead providing a lead differential;
   e. a second rotatably fixed, radially inner screw having an external helical groove with a lead corresponding to said second lead and cooperating with said internal groove of said tubular screw to provide a second raceway, the inner screw having an internal raceway ball return passage; and
   f. a second train of load bearing balls in said second raceway transmitting load between said tubular screw and second screw to move said second screw axially differentially in the same axial direction as said tubular screw only an axial distance corresponding to the number of rotations of the tubular screw times the lead differential.

2. The assembly of claim 1 wherein said second train of balls includes balls of predetermined greater diameter than the balls of said first train to provide greater load carrying capacity.

3. The assembly of claim 1 including a brake operating member and wherein said inner screw is axially aligned to operate said brake actuating member.

4. The assembly of claim 1 wherein said inner screw has end cap members secured to its ends and said internal raceway return passage includes a passage extending axially in said inner screw and axially inclined radially extending passages at either end of said axially extending passage leading to said external helical groove on said inner screw; said axially inclined passages being partly defined by the generally axially projecting portions of said end cap members.

5. The assembly of claim 1 wherein a motor having a rotary drive shaft and housing incorporates said nut and said tubular screw axially slidably connects with said drive shaft.

6. The assembly of claim 1 wherein said helical grooves of said tubular screw are generally co-axial.

7. A method of operating a differential ball nut and screw assembly incorporating an axially and rotatable fixed nut; a tubular drive screw having an externally helical groove providing a first raceway with said nut and a generally co-extensive internal helical groove; a rotatably fixed inner actuator screw received in said tubular drive screw and having an external helical groove forming a second raceway with said internal groove of the drive screw; and a first ball train in said first raceway and a second ball train in said second raceway comprising:
   a. providing said tubular screw with external and internal helical grooves of the same hand but different lead, with the lead of the internal groove being reduced to provide a lead differential between said external and internal grooves;
   b. moving said tubular drive screw in one axial direction by revolving it relative to said axially and rotatably fixed ball nut;
   c. providing said actuator screw external groove with a reduced lead corresponding to said reduced lead of the internal groove of the tubular drive screw;
   d. internally carrying said actuator screw axially along with the tubular screw; and
   e. utilizing a recirculating ball train between said internal groove of the tubular screw and exterior groove of the inner actuator screw to differentially change axial movement of said inner actuator screw relative to the axial movement of said tubular screw and move said inner screw an axial distance corresponding only to the number of rotations of the tubular screw times the lead differential.

8. The method of claim 7 comprising providing said actuator screw with a partly axial internal raceway return passage communicating with said exterior helical groove of the actuator screw, and recirculating said ball train therethrough.

9. The method of claim 8 comprising rotatably connecting a motor drive shaft to said tubular screw in a manner to permit relative axial movement of said tubular screw and drive shaft as they co-rotate.

10. A dual screw differential ball screw and nut assembly comprising:
   a. an axially and rotatably fixed nut having an internal helical groove with a first lead;
   b. a first tubular ball screw with an external helical groove having a corresponding lead cooperating with said nut groove to provide a first raceway;
   c. a train of balls in said first raceway;
   d. said tubular ball screw having an internal helical groove generally coextending with and of the same hand as said external helical groove, with a second different lead relative to said first lead;
   e. a second rotatably fixed, radially inner screw having an external helical groove with a lead corresponding to said second lead and cooperating with said internal groove of said tubular screw to provide a second raceway; and
   f. a second train of load bearing balls received in said second raceway to transmit load to move said screws axially in the same direction differentially.

11. The assembly of claim 10 wherein said first and second raceways are generally coextensive.

12. The assembly of claim 11 wherein said inner screw has an internal ball return passage.

13. The assembly of claim 10 wherein balls in said second train are of a predetermined greater diameter than balls in said first train.

14. A method of making a differential ball screw and nut assembly comprising the steps of:
   a. providing a tubular ball screw having generally co-axial differential lead helical groove portions of the same hand externally and internally, the lead of the internal groove being reduced relative to the external groove;
   b. inserting an inner screw, having an external helical groove with a lead corresponding to said reduced lead of said internal helical groove portion of the tubular screw to form an inner raceway, into said tubular screw;
   c. loading a train of abutting recirculating load transfer balls to said inner raceway;
   d. providing a fixed ball nut having an internal helical groove corresponding to and forming an outer raceway with said external groove portion on said tubular screw and loading a train of abutting recirculating load transfer balls to said outer raceway; and
   e. fixing said inner screw from rotating while permitting it to translate.

15. The method of claim 14 wherein the balls loaded to said inner raceway are of greater diameter than the balls loaded to said outer raceway.

16. The method of claim 14 comprising forming an internal ball return passage in said inner screw which has an axial component and axially inclined radially extending end components leading to said external groove on the inner screw.

17. The method of claim 14 comprising rotatably connecting a rotary drive shaft to said tubular screw such as to permit axial movement of said screw relative to said drive shaft as they co-rotate.

18. The method of claim 15 comprising axially aligning said inner screw with a brake actuating member.

* * * * *